(12) United States Patent
Mayer et al.

(10) Patent No.: US 9,714,611 B2
(45) Date of Patent: Jul. 25, 2017

(54) HEAT SHIELD MANIFOLD SYSTEM FOR A MIDFRAME CASE OF A GAS TURBINE ENGINE

(71) Applicants: Clinton A. Mayer, Jupiter, FL (US); Jesse Eng, Jupiter, FL (US); Cheryl A. Schopf, Jupiter, FL (US)

(72) Inventors: Clinton A. Mayer, Jupiter, FL (US); Jesse Eng, Jupiter, FL (US); Cheryl A. Schopf, Jupiter, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 806 days.

(21) Appl. No.: 13/768,038

(22) Filed: Feb. 15, 2013

(65) Prior Publication Data

US 2014/0230441 A1    Aug. 21, 2014

(51) Int. Cl.
*F02C 7/12* (2006.01)
*F01D 25/26* (2006.01)

(52) U.S. Cl.
CPC .............. *F02C 7/12* (2013.01); *F01D 25/26* (2013.01); *F05D 2260/231* (2013.01)

(58) Field of Classification Search
CPC . F01D 25/26; F01D 11/24; F01D 9/06; F01D 9/065; F01D 25/12; F01D 25/14; F02C 7/12; F02C 7/18; F02C 6/08; F02C 9/18; F05D 2260/231
See application file for complete search history.

(56) References Cited

U.S. PATENT DOCUMENTS

| 3,427,000 | A | * | 2/1969 | Scalzo | F01D 9/042 415/108 |
| 3,791,758 | A | * | 2/1974 | Jenkinson | F01D 5/081 415/116 |
| 4,849,895 | A | * | 7/1989 | Kervistin | F01D 11/24 415/178 |
| 5,134,844 | A | * | 8/1992 | Lee | F01D 5/08 415/116 |
| 5,195,868 | A | | 3/1993 | Plemmons et al. | |
| 5,761,907 | A | | 6/1998 | Pelletier et al. | |
| 5,782,076 | A | | 7/1998 | Huber et al. | |
| 6,050,080 | A | | 4/2000 | Horner | |
| 6,065,282 | A | | 5/2000 | Fukue et al. | |
| 6,295,803 | B1 | | 10/2001 | Bancalari | |

(Continued)

FOREIGN PATENT DOCUMENTS

| EP | 1235032 A2 | 8/2002 |
| EP | 1895095 A1 | 3/2008 |
| WO | 2010/146287 | 12/2010 |

*Primary Examiner* — Mark Laurenzi
*Assistant Examiner* — Brandon Lee

(57) ABSTRACT

A heat shield manifold system for an inner casing between a compressor and turbine assembly is disclosed. The heat shield manifold system protects the outer case from high temperature compressor discharge air, thereby enabling the outer case extending between a compressor and a turbine assembly to be formed from less expensive materials than otherwise would be required. In addition, the heat shield manifold system may be configured such that compressor bleed air is passed from the compressor into the heat shield manifold system without passing through a conventional flange to flange joint that is susceptible to leakage.

20 Claims, 2 Drawing Sheets

(56) References Cited

U.S. PATENT DOCUMENTS

| | | | |
|---|---|---|---|
| 6,584,778 B1 * | 7/2003 | Griffiths | F02C 7/14 60/226.1 |
| 2008/0047274 A1 | 2/2008 | Fish et al. | |
| 2008/0060360 A1 | 3/2008 | Stastny et al. | |
| 2009/0077974 A1 | 3/2009 | Dahlke et al. | |
| 2010/0071382 A1 * | 3/2010 | Liang | F01D 9/023 60/806 |
| 2010/0251720 A1 | 10/2010 | Pelletier et al. | |
| 2010/0316490 A1 | 12/2010 | Severin et al. | |
| 2011/0110771 A1 | 5/2011 | Morgan et al. | |
| 2011/0206502 A1 | 8/2011 | Rulli et al. | |

\* cited by examiner

HEAT SHIELD MANIFOLD SYSTEM FOR A MIDFRAME CASE OF A GAS TURBINE ENGINE

STATEMENT REGARDING FEDERALLY SPONSORED RESEARCH OR DEVELOPMENT

Development of this invention was supported in part by the United States Department of Energy, Advanced Turbine Development Program, Contract No. DE-FC26-05NT42644-Sub011. Accordingly, the United States Government may have certain rights in this invention.

FIELD OF THE INVENTION

This invention is directed generally to turbine engines, and more particularly to cooling fluid feed systems in turbine engines.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine blade assemblies to these high temperatures. As a result, turbine blades and turbine vanes must be made of materials capable of withstanding such high temperatures. Turbine blades, vanes and other components often contain cooling systems for prolonging the life of these items and reducing the likelihood of failure as a result of excessive temperatures.

Typically, a midframe case extends between a compressor and in some confirguations between a compressor case and an exhaust case. The midframe case often channels compressor bleed air to the turbine rotor assembly. As the midframe shell air temperature exceeds 450 degrees Celsius, a majority of the commonly used steel alloys become creep limited. Over time, the materials become embrittled and suffer from permanent creep deformation at temperatures above 450 degrees Celsius. Thus, as design requirements increase and peak compressor discharge temperatures approach 550 degrees Celsius, meeting the 160,000 hour and 5,000 start component life cycle thresholds becomes very unlikely using standard alloys and conventional technology.

SUMMARY OF THE INVENTION

This invention relates to a heat shield manifold system for an inner casing between a compressor and turbine assembly is disclosed. The heat shield manifold system protects an outer case from high temperature compressor discharge air, thereby enabling the outer case extending between the compressor and the turbine assembly to be formed from less expensive materials than otherwise would be required. In addition, the heat shield manifold system may be configured such that compressor bleed air is passed from the compressor into the heat shield manifold system without passing through a convention flange to flange joint that is susceptible to leakage.

The heat shield manifold system may be included within a turbine engine and may include one or more combustors positioned upstream from a rotor assembly. The rotor assembly may include at least first and second rows of turbine blades extending radially outward from a rotor. The turbine engine may also include a compressor positioned upstream from the combustor and may include one or more rows of turbine vanes extending radially inward and terminating proximate to the rotor assembly. The turbine engine may also include a turbine airfoil cooling chamber in communication with turbine airfoils and an inner case extending from a downstream end region of the compressor to an upstream end region of the rotor assembly. The turbine engine may include a heat shield wall positioned radially outward of the inner case and circumferentially encapsulating the inner case, thereby forming a heat shield manifold on an outer surface of the inner case. The heat shield wall may be in communication with a compressor bleed exhaust such that the compressor bleed exhaust supplies cooling fluid to the heat shield manifold and is in communication with a turbine airfoil cooling chamber such that the heat shield manifold supplies cooling fluid to the turbine airfoil cooling chamber. In one embodiment, the turbine airfoil cooling chamber may be a turbine vane row two cooling air chamber that provides cooling fluid to row two turbine vanes.

The turbine engine may also include an outer case extending from a downstream end region of the compressor to an upstream end region of the rotor assembly and circumferentially encapsulating the heat shield wall. In one embodiment, the heat shield manifold may be in communication with the compressor through at least one orifice in a support flange radially inward of an outer case, which eliminates a possibility of flange to flange leakage. In another embodiment, a jumper conduit may extend between the compressor and the heat shield manifold. The jumper conduit may extend at least partially externally of an outer case extending from a downstream end region of the compressor to an upstream end region of the rotor assembly and circumferentially encapsulating the heat shield wall. The heat shield manifold system may also include a heat exchanger configured to chill cooling fluid from the compressor before the cooling fluid is passed to the heat shield manifold. In yet another embodiment, the heat shield manifold system may include a bleed exhaust conduit extending between the compressor and the turbine airfoil cooling chamber. The bleed exhaust conduit may extend at least partially externally of an outer case extending from a downstream end region of the compressor to an upstream end region of the rotor assembly and circumferentially encapsulating the heat shield wall.

The heat shield manifold system may include one or more jumper throttle systems configured to dynamically throttle compressor bleed fluid into the jumper conduit or may include one or more airfoil cooling chamber throttle systems configured to dynamically throttle compressor bleed fluid into the turbine airfoil cooling chamber, or may include both systems. In one embodiment, the jumper throttle system may be formed from at least one valve controlling the flow of cooling fluid through the jumper conduit. The airfoil cooling chamber throttle system may be formed from at least one valve controlling the flow of cooling fluid through the bleed exhaust conduit into the turbine airfoil cooling chamber.

An advantage of this invention is that the invention protects an outer case, which extends from a downstream end region of a compressor to an upstream end of a rotor assembly and circumferentially encapsulating an inner shield, from high temperature compressor discharge air.

Another advantage of this invention is that by shielding the outer case from high temperature compressor discharge air enables the outer case to be formed from less expensive materials, such as, but not limited to, low cost steel alloys.

Yet another advantage of this invention is that this invention is useful in turbine engines where the temperature of compressor discharge air approaches or exceeds either the high end of the creep regime or embrittlement temperature for steels.

Another advantage of this invention is that it could be used either with or without a cooler or heater, or both, to regulate the casing temperatures during transients to actively control blade tip clearances by reducing the thermal lag between the rotor and the casing.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
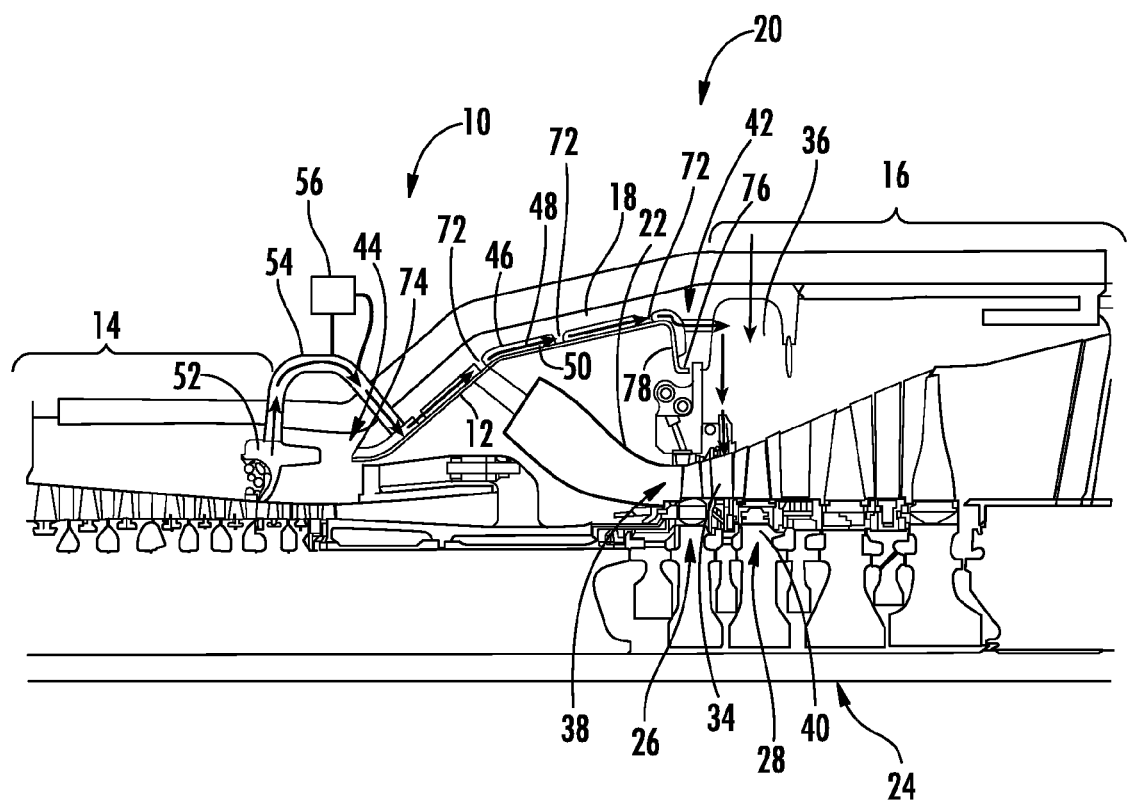
FIG. 1 is a cross-sectional side view of a portion of a turbine engine including a compressor positioned upstream from a turbine assembly and coupled together via a midframe inner case and further including a heat shield manifold system.
Figure 2:
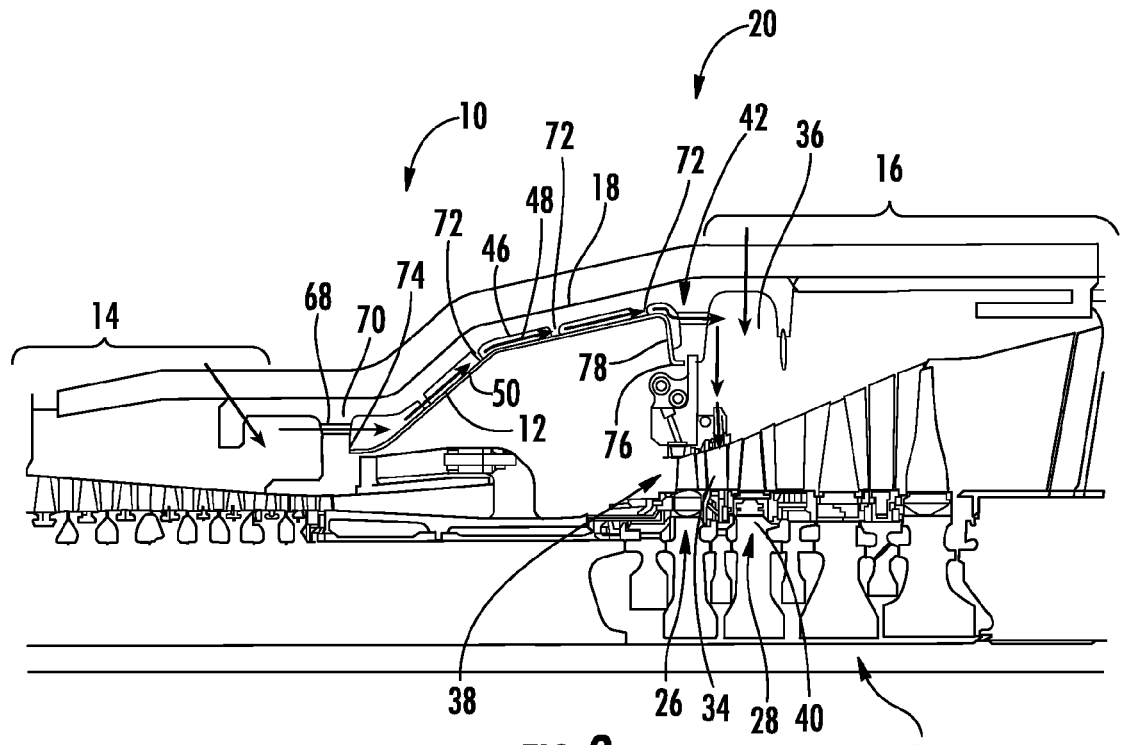
FIG. 2 is a cross-sectional side view of another embodiment of the heat shield manifold system.
Figure 3:
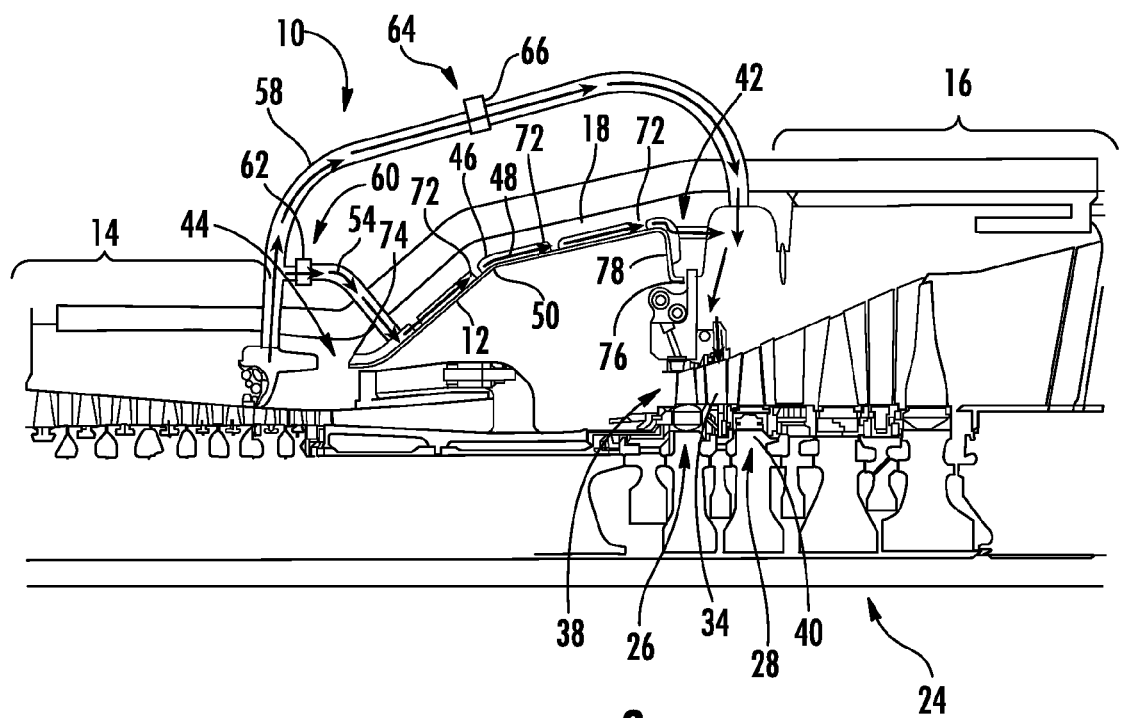
FIG. 3 is a cross-sectional side view of another embodiment of the heat shield manifold system.

As shown in FIGS. 1-3, this invention is directed to a heat shield manifold system 10 for an inner casing 12 between a compressor 14 and turbine assembly 16 is disclosed. The heat shield manifold system 10 protects an outer case 18 from high temperature compressor discharge air, thereby enabling the outer case 18 extending between the compressor 14 and the turbine assembly 16 to be formed from less expensive materials than otherwise would be required. In addition, the heat shield manifold system 10 may be configured such that compressor bleed air is passed from the compressor 14 into the heat shield manifold system 10 without passing through a convention flange to flange joint that is susceptible to leakage.

The heat shield manifold system 10 may be positioned within a turbine engine 20 that may be formed from one or more combustors 22 positioned upstream from a rotor assembly 24. The rotor assembly 24 may include at least first and second rows 26, 28 of turbine blades 30 extending radially outward from a rotor 32. A compressor 14 may be positioned upstream from the combustor 22. One or more rows of turbine vanes 34 may extend radially inward and may terminate proximate to the rotor assembly 24. A turbine airfoil cooling chamber 36 may be in communication with turbine airfoils 38, and more particularly, with cooling systems 40 within turbine airfoils 38, such as, but not limited to, turbine vanes 34.

An inner case 12 may extend from a downstream end region 42 of the combustor 22 to an upstream end region 44 of the rotor assembly 24. A heat shield wall 46 may be positioned radially outward of the inner case 12. In at least one embodiment, the heat shield wall 46 may circumferentially encapsulate the inner case 12, thereby forming a heat shield manifold 48 on an outer surface 50 of the inner case 12. The heat shield wall 46 may be in communication with a compressor bleed exhaust 52 such that the compressor bleed exhaust 52 supplies cooling fluid to the heat shield manifold 48. The heat shield wall 46 may also be in communication with a turbine airfoil cooling chamber 36 such that the heat shield manifold 48 supplies cooling fluid to the turbine airfoil cooling chamber 36. In at least one embodiment, the turbine airfoil cooling chamber 36 may be a turbine vane row two cooling air chamber that provides cooling fluid to row two turbine vanes 34.

The heat shield wall 46 may be supported by one or more stand-off supports 72. The stand-off supports 72 may extend radially outward from the inner case 12 and may be spaced apart circumferentially and axially to provide support for the heat shield wall 46 against the pressure load. The spacing and height of the stand-off supports 72 may be adjusted to provide proper cooling flow requirements and structural support of the heat shield wall 46. The forward and aft ends 74, 76 of the heat shield wall 46 may be affixed to the outer case 18 by way of a weld, such as, but not limited to, a fillet weld. In addition, the heat shield 46 may include combustion portals such that combustor baskets can extend through the heat shield wall 46 and the inner case 12. The heat shield wall 46 may be welded to the combustion portals via a full hoop fillet weld to the outer casing 18. These welds prevent inflow of high temperature compressor discharge air from the heat shield manifold 48.

The heat shield wall 46 may be formed from any appropriate ductile material, such as, but not limited to, a low strength ductile steel alloy, which is capable of withstanding the thermal growth differences between the outer case 18 and the heat shield wall 46. In order to offset the thermal stresses between the outer case 18 and the heat shield wall 46, a dog leg section 78 was incorporated onto the aft end 76 of the heat shield wall 46 to provide axial flexibility. The dog leg section 78 may extend circumferentially around the inner case 12. Similar to the outer case 18, the heat shield wall 46 may be split at horizontal joints to form two sections. The sections may be sealed at these horizontal joints via horizontal clamp loads.

The turbine engine 20 may also include an outer case 18 extending from a downstream end region 42 of the combustor 22 to an upstream end region 44 of the rotor assembly 24 and circumferentially encapsulating the heat shield wall 46. In at least one embodiment, as shown in FIGS. 1 and 3, the heat shield manifold system 10 may include a jumper conduit 54 extending between the compressor 14 and the heat shield manifold 48. The jumper conduit 54 may have any cross-sectional shape and may have any size to create the necessary pressure profile across the jumper conduit 54. In at least one embodiment, one or more heat exchangers 56 may be configured to chill cooling fluid from the compressor 14 before the cooling fluid is passed to the heat shield manifold 48. The heat exchanger 56 may be configured to be used as a cooler or may be configured to be used as a heater. In yet another embodiment, one or more heat exchangers 56 may function as a cooler and one or more heat exchangers 56 may function as a heater.

In another embodiment, as shown in FIG. 3, the heat shield manifold system 10 may include one or more bleed exhaust conduits 58 extending between the compressor 14 and the turbine airfoil cooling chamber 36 to provide cooling fluids directly to the turbine airfoil cooling chamber 36. The heat shield manifold system 10 may also include one or more jumper throttle systems 60 configured to dynamically throttle compressor bleed fluid into the jumper conduit 54. In at least one embodiment, the jumper throttle system 60 may be formed from one or more valves 62 controlling the flow of cooling fluid through the jumper conduit 54. The heat shield manifold system 10 may also include one or more airfoil cooling chamber throttle systems 64 configured to dynamically throttle compressor bleed fluid into the turbine airfoil cooling chamber 36. In at least one embodiment, airfoil cooling chamber throttle system 64 may be formed from one or more valves 66 controlling the flow of cooling fluid through the bleed exhaust conduit 58 into the turbine airfoil cooling chamber 36. The jumper conduit 54 may extend at least partially externally of an outer case 18 extending from the downstream end region 42 of the combustor 22 to an upstream end region 44 of the rotor assembly 24 and circumferentially encapsulating the heat shield wall 46.

In yet another embodiment, as shown in FIG. 2, a bleed exhaust conduit 58 may extend between the compressor 14 and the turbine airfoil cooling chamber 36. The bleed exhaust conduit 58 may extend at least partially externally of an outer case 18 extending from a downstream end region 42 of the combustor 22 to an upstream end region 44 of the rotor assembly 24 and may circumferentially encapsulate the heat shield wall 46. The heat shield manifold 48 may be in communication with the compressor 14 through one or more orifices 68 in a support flange 70 positioned radially inward of the outer case 18, which eliminates a possibility of flange to flange leakage.

During use, compressor bleed fluids, such as, but not limited to, air, may flow from the compressor 14 to the turbine airfoil cooling chamber 36 through the heat shield manifold system 10 to prevent compressor bleed air from contacting the outer case 18. As shown in FIG. 2, compressor bleed fluid may flow from the compressor 14 through the orifice 68 in the support flange 70 and into the heat shield manifold 48. The fluid may then flow through the heat shield manifold 48 and into the turbine airfoil cooling chamber 36. In another embodiment, as shown in FIG. 1, compressor bleed fluid may flow from the compressor 14 through the jumper conduit 54 and into the heat shield manifold 48. The fluid may then flow through the heat shield manifold 48 and into the turbine airfoil cooling chamber 36. In yet another embodiment, as shown in FIG. 3, compressor bleed fluid may flow from the compressor 14 through the jumper conduit 54 and into the heat shield manifold 48. The fluid may then flow through the heat shield manifold 48 and into the turbine airfoil cooling chamber 36. Compressor bleed flow may also flow from the compressor 14 to the turbine airfoil cooling chamber 36 through the bleed exhaust conduit 58. The flow of compressor bleed fluid through the jumper conduit 54 and the bleed exhaust conduit 58 may be regulated through the use of the jumper throttle system 60 and the airfoil cooling chamber throttle system 64. The jumper throttle system 60 and the airfoil cooling chamber throttle system 64 may be controlled manually or automatically.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A turbine engine, comprising:
    at least one combustor positioned upstream from a rotor assembly, wherein
    the rotor assembly includes at least first and second rows of turbine blades extending radially outward from a rotor;
    a compressor positioned upstream from the at least one combustor;
    at least one row of turbine vanes extending radially inward and terminating proximate to the rotor assembly;
    an inner case extending from a downstream end region of the compressor to an upstream end region of the rotor assembly;
    a heat shield wall positioned radially outward of the inner case and circumferentially encapsulating the inner case, thereby forming a heat shield manifold on an outer surface of the inner case;
    a turbine airfoil cooling chamber in communication with turbine airfoils, wherein the turbine airfoil cooling chamber extends downstream of an end of the inner case and an end of the heat shield wall;
    a support extending radially outward from the inner case and supporting the heat shield wall; and
    a compressor bleed exhaust in communication with the heat shield wall whereby the compressor bleed exhaust supplies cooling fluid to the heat shield manifold and is in communication with a turbine airfoil cooling chamber such that the heat shield manifold supplies cooling fluid to the turbine airfoil cooling chamber.

2. The turbine engine of claim 1, wherein the turbine airfoil cooling chamber is a turbine vane row two cooling air chamber that provides cooling fluid to row two turbine vanes.

3. The turbine engine of claim 1, further comprising an outer case extending from a downstream end region of the compressor to an upstream end region of the rotor assembly and circumferentially encapsulating the heat shield wall.

4. The turbine engine of claim 1, further comprising a jumper conduit extending between the compressor and the heat shield manifold.

5. The turbine engine of claim 4, further comprising a heat exchanger configured to chill cooling fluid from the compressor before the cooling fluid is passed to the heat shield manifold.

6. The turbine engine of claim 4, further comprising a bleed exhaust conduit extending between the compressor and the turbine airfoil cooling chamber.

7. The turbine engine of claim 6, further comprising at least one jumper throttle system configured to dynamically throttle compressor bleed fluid into the jumper conduit.

8. The turbine engine of claim 7, further comprising at least one airfoil cooling chamber throttle system configured to dynamically throttle compressor bleed fluid into the turbine airfoil cooling chamber.

9. The turbine engine of claim 7, wherein the at least one jumper throttle system is at least one valve controlling the flow of cooling fluid through the jumper conduit.

10. The turbine engine of claim 6, further comprising at least one airfoil cooling chamber throttle system configured to dynamically throttle compressor bleed fluid into the turbine airfoil cooling chamber.

11. The turbine engine of claim 10, wherein the at least one airfoil cooling chamber throttle system is at least one valve controlling the flow of cooling fluid through the bleed exhaust conduit into the turbine airfoil cooling chamber.

12. The turbine engine of claim 4, wherein the jumper conduit extends at least partially externally of an outer case extending from a downstream end region of the compressor to an upstream end region of the rotor assembly and circumferentially encapsulating the heat shield wall.

13. The turbine engine of claim 1, further comprising a bleed exhaust conduit extending between the compressor and the turbine airfoil cooling chamber;

wherein the bleed exhaust conduit extends at least partially externally of an outer case extending from a downstream end region of the compressor to an upstream end region of the rotor assembly and circumferentially encapsulating the heat shield wall.

14. The turbine engine of claim 1, wherein the heat shield manifold is in communication with the compressor through at least one orifice in a support flange radially inward of an outer case, which eliminates a possibility of flange to flange leakage.

15. A turbine engine, comprising:
at least one combustor positioned upstream from a rotor assembly, wherein
the rotor assembly includes at least first and second rows of turbine blades extending radially outward from a rotor;
a compressor positioned upstream from the at least one combustor;
at least one row of turbine vanes extending radially inward and terminating proximate to the rotor assembly;
an inner case extending from a downstream end region of the compressor to an upstream end region of the rotor assembly;
a heat shield wall positioned radially outward of the inner case and circumferentially encapsulating the inner case, thereby forming a heat shield manifold on an outer surface of the inner case;
a turbine airfoil cooling chamber in communication with turbine airfoils, wherein the turbine airfoil cooling chamber extends downstream of an end of the inner case and an end of the heat shield wall;
a support extending radially outward from the inner case and supporting the heat shield wall;
an outer case extending from a downstream end region of the compressor to an upstream end region of the rotor assembly and circumferentially encapsulating the heat shield wall;
a compressor bleed exhaust in communication with the heat shield wall whereby the compressor bleed exhaust supplies cooling fluid to the heat shield manifold and is in communication with a turbine airfoil cooling chamber such that the heat shield manifold supplies cooling fluid to the turbine airfoil cooling chamber; and
wherein the turbine airfoil cooling chamber is a turbine vane row two cooling air chamber that provides cooling fluid to row two turbine vanes.

16. The turbine engine of claim 15, further comprising a jumper conduit extending between the compressor and the heat shield manifold, wherein the jumper conduit extends at least partially externally of an outer case extending from a downstream end region of the compressor to an upstream end region of the rotor assembly and circumferentially encapsulating the heat shield wall.

17. The turbine engine of claim 15, further comprising a heat exchanger configured to chill cooling fluid from the compressor before the cooling fluid is passed to the heat shield manifold.

18. The turbine engine of claim 15, further comprising a bleed exhaust conduit extending between the compressor and the turbine airfoil cooling chamber,
wherein the bleed exhaust conduit extends at least partially externally of an outer case extending from a downstream end region of the compressor to an upstream end region of the rotor assembly and circumferentially encapsulating the heat shield wall.

19. The turbine engine of claim 18, further comprising at least one jumper throttle system configured to dynamically throttle compressor bleed fluid into the jumper conduit, and at least one airfoil cooling chamber throttle system configured to dynamically throttle compressor bleed fluid into the turbine airfoil cooling chamber.

20. The turbine engine of claim 15, wherein the heat shield manifold is in communication with the compressor through at least one orifice in a support flange radially inward of an outer case, which eliminates a possibility of flange to flange leakage.

* * * * *